United States Patent [19]
Bahder et al.

[11] 3,845,235
[45] Oct. 29, 1974

[54] PREFABRICATED CAPACITIVE GRADED SPLICE DEVICE

[75] Inventors: George Bahder, Suffern; Carlos Katz, Spring Valley, both of N.Y.

[73] Assignee: Phelps Dodge Industries, Inc., New York, N.Y.

[22] Filed: Sept. 13, 1973

[21] Appl. No.: 397,113

[52] U.S. Cl. .............................. 174/73 R, 317/260
[51] Int. Cl. ...................... H02g 15/08, H01g 3/17
[58] Field of Search ............ 174/21 R, 21 JS, 21 C, 174/22 R, 22 C, 73 R, 73 SC, 142, 143; 317/260

[56] References Cited
UNITED STATES PATENTS

| | | | |
|---|---|---|---|
| 2,010,530 | 8/1935 | Atkinson | 174/73 R UX |
| 3,453,372 | 7/1969 | Gahir et al. | 174/73 R UX |

FOREIGN PATENTS OR APPLICATIONS

| | | | |
|---|---|---|---|
| 107,258 | 6/1917 | Great Britain | 174/73 R |
| 317,735 | 11/1969 | Sweden | 174/73 R |

*Primary Examiner*—Laramie E. Askin
*Attorney, Agent, or Firm*—Davis, Hoxie, Faithfull & Hapgood

[57] ABSTRACT

A prefabricated capacitive graded splice device for high voltage cable including a rigid supporting member, an equipotential shielding ring surrounding the rigid supporting member at the longitudinal center thereof, capacitive graded sections surrounding the rigid supporting member, and an insulating member and metallic shield surrounding the equipotential shielding ring and the capacitive graded sections.

4 Claims, 5 Drawing Figures

PATENTED OCT 29 1974  3,845,235

PATENTED OCT 29 1974

PREFABRICATED CAPACITIVE GRADED SPLICE DEVICE

The present invention relates to cable splices, and more specifically to a prefabricated capacitive graded splice device for high voltage cables.

Known cable splicing techniques generally use the following steps to form a cable splice:

1. The cable shields and cable insulation at the ends of the cables to be joined are removed for a given distance depending upon cable voltage and conductor size.

2. The insulation is removed one tape at a time to form a pencil or step pattern adjacent to the ends of the exposed central conductors of the cables to be joined.

3. The exposed central conductors are joined by a connector. Around the connector and adjacent conductors, an electrostatic shield is applied. Oil impregnated paper is used to rebuild the insulation up to the normal cable insulation diameter.

4. Additional oil impregnated paper or tape is applied over the rebuilt insulation and over a portion of the cable insulation extending beyond the pencil patterns. The paper extending beyond the pencil patterns is shaped to form stress relief cones.

5. A metallic shield is applied over the joint area and electrically connected to the cable insulation shields.

These previously known splicing techniques have many disadvantages. The use of hand applied tapes or paper sheets of varying widths, e.g., one-half inch and greater, is time consuming and requires skilled technicians. Further, the manual application of paper or tapes makes it difficult to achieve a uniform interface between the penciled cable insulation and the hand applied paper or tapes. This interface is recognized as the weakest part of the joint. Additionally, during installation there is prolonged exposure of the insulation to the surrounding environment with possible contamination of the cable dielectric. Also, there is no provision for pretesting the elements of the joint.

Various constructions have been proposed in an attempt to provide a prefabricated joint. Linderholm U.S. Pat. No. 3,005,868 discloses a partially prefabricated joint which requires the use of alternate layers of insulation and foil to form stress relief cones and to rebuild the cable insulation in the field. Palmieri U.S. Pat. No. 3,051,770 discloses a prefabricated joint which includes an electrode embedded in an epoxy sleeve. This joint requires the application of two bell shaped masses of insulation and metallic screening material to smooth out the slope of the epoxy sleeve and form the proper stress relief cones. However, these constructions are not totally prefabricated, but require rebuilding of the cable insulation in the field to form stress relief cones.

It is an object of the present invention to provide a prefabricated capacitive graded splice device which reduces field installation time.

It is a further object of the present invention to provide a prefabricated splice device which eliminates the need to form stress relief cones at the cable joint.

It is a further object of the present invention to provide a highly reliable prefabricated capacitive graded splice device for the distribution of longitudinal and radial voltage stress.

It is a further object of the present invention to provide a pretested, capacitive graded splice device.

It is still a further object of the present invention to provide a prefabricated capacitive graded splice device which requires a minimum of installation skill.

It is a still further object of the present invention to provide a capacitive graded splice device capable of machine fabrication.

Other objects, aspects and advantages of the present invention will be apparent when the detailed description is considered with the drawing.

Briefly, the capacitive graded splice device of the present invention includes a rigid supporting sleeve member with an equipotential shielding ring located at the longitudinal center of the rigid supporting sleeve. Adjacent the equipotential shielding ring and supported by the supporting sleeve are identical capacitive graded sections of the type disclosed by A. L. McKean in patent application Ser. No. 233,632, filed Mar. 10, 1972, now abandoned. The capacitors adjacent the equipotential shielding ring are electrically connected thereto. The remote capacitors are grounded. The equipotential shielding ring and capacitive graded sections are surrounded by a cylindrical insulating member and metallic shield. Any space existing between the exposed cable insulation at the cable ends and the rigid supporting member is filled by insulating paper hand applied as tubes.

The present invention is illustrated with the accompanying drawing in which.

Figure 1:
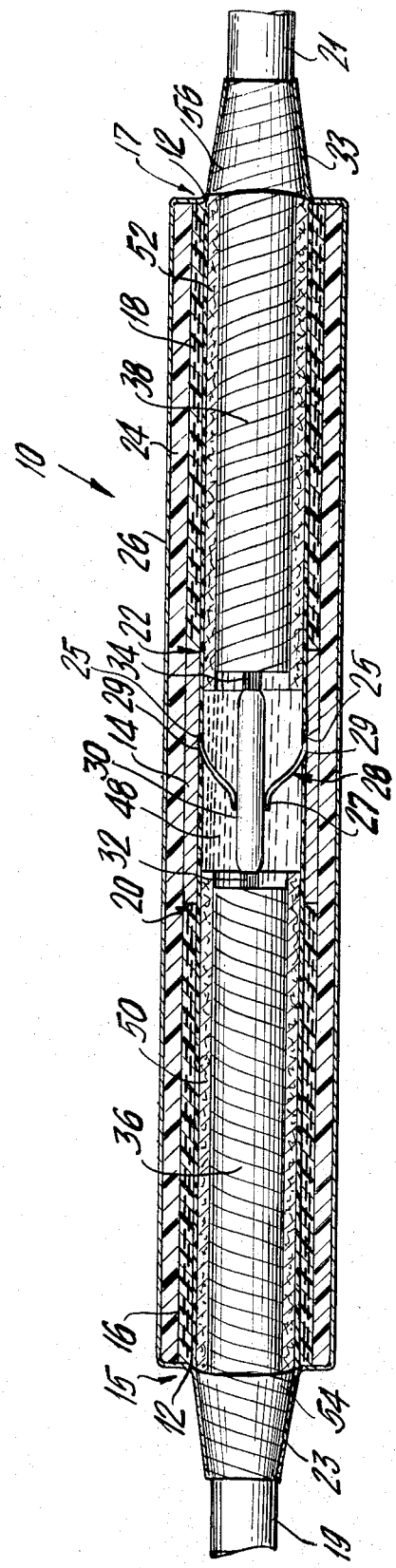
FIG. 1 shows a prefabricated capacitive graded splice device according to the present invention.

Referring to FIG. 1, the prefabricated capacitive graded splice device 10 of the present invention includes a rigid supporting member or sleeve 12 surrounded at its longitudinal center by an equipotential shielding ring 14. Positioned adjacent the shielding ring 14 and supported by the sleeve 12 are a pair of identical capacitive graded sections 16 and 18, respectively. The capacitors at the ends 20 and 22 of the capacitive graded sections 16 and 18, adjacent the shielding ring 14, are electrically connected to it, and the capacitors at the remote ends 15 and 17 of the capacitive graded sections 16 and 18 are electrically connected to a metallic splice shield 26. Cable insulation shields 19 and 21 may be electrically connected to the metallic splice shield 26, e.g., by metallic tape 23 and 33, respectively. The shielding ring 14 and capacitive graded sections 16 and 18 are surrounded by a cylindrical insulating member 24, e.g., of electrical grade cellulose paper, and the metallic shield 26.

The supporting member 12 is formed from insulating materials, e.g., phenolics, epoxies or other rigid synthetic materials. The supporting member 12 has slots 25 to receive one end 29 of spring type electrostatic connectors 28 for contact with the shielding ring 14. The other end 27 of the electrostatic connectors 28 contacts a cable connector 30 which electrically joins the central conductors 32 and 34.

The shielding ring 14 serves as an equipotential element to which the high voltage side of the graded capacitors are connected. The equipotential shielding ring 14 is illustrated in FIG. 1 as a single cylindrical metallic element; however, it should be understood that the equipotential shielding ring 14 may assume other configurations, e.g., two interconnected concentric metallic rings, located inside and outside of the rigid supporting sleeve 12, or a split ring.

The longitudinal and radial distribution of voltage stress is achieved by utilizing printed circuit or foil laminated capacitors. The printed circuit capacitors may be made of metallized backed polyester tape or sheets. Preferably, the printed circuit capacitors are formed from a dielectric laminate which comprises a central layer of polypropylene film to each side of which is intimately bonded a metallized cellulose paper. A typical such laminate would have central polypropylene film layer of 2.5 mils with cellulose paper layers of 1.3 mils on each side. This laminate construction provides high dielectric breakdown strength as well as the longitudinal flow of oil through the porous cellulose paper. Other insulating materials, e.g., paper, synthetic films or combinations having good dielectric strength and relatively low dielectric loss properties may also be used. Capacitor dimensions are determined in accordance with voltage ratings and materials.

Figure 2:
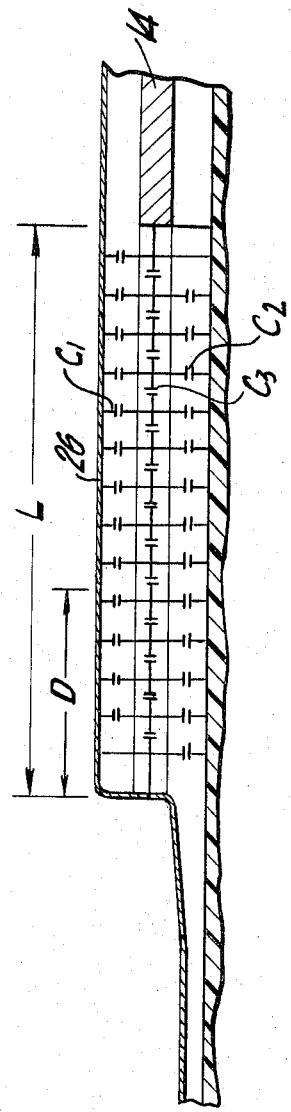
FIG. 2 is an equivalent circuit showing the capacitance distribution in the splice device.

An equivalent circuit for the capacitive graded splice device 10 is shown in FIG. 2. The following equation provides a determination of the voltage stress at any point along the interface between the graded capacitance sections 16 and 18 and the supporting member 12, respectively.

$$E = V_o \sqrt{A} \, [C_1 \cosh \sqrt{A} D + c_2 \cosh \sqrt{A}(L-D)] / [(C_1 + C_2) \sinh \sqrt{A} L]$$

where $A = c_1 / + C_2/C_3$ $L$ is the length of the capacitance graded section.

$D$ is the distance from the remote end of the capacitance graded section to the point at which it is desired to determine the voltage stress.

$C_1$ is the capacitance of the cylindrical insulating member.

$C_2$ is the capacitance of the cable insulation, and any other insulation between the cable and the capacitive graded section.

$C_3$ is the capacitance of the capacitive graded section.

$V_o$ is the cable potential.

Figure 3:
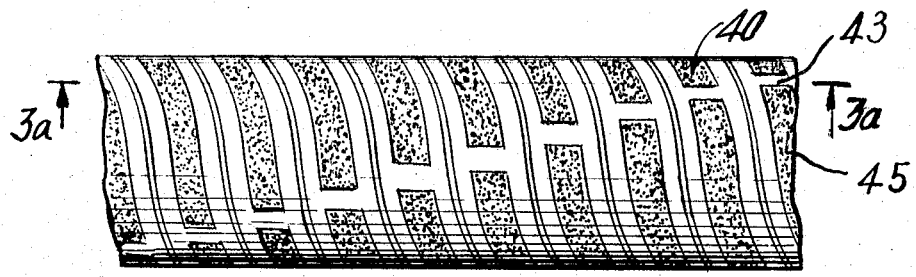
FIG. 3 is a side view in elevation of a capacitive graded section composed of alternating capacitive and insulating tapes.
Figure 3A:
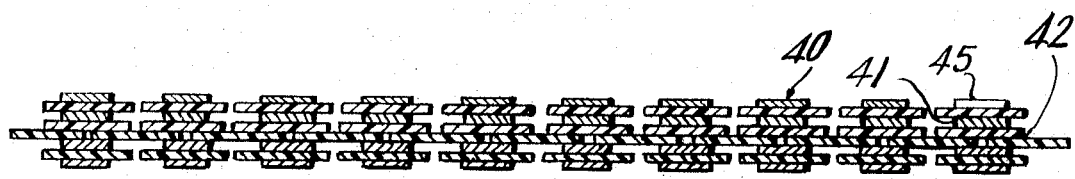
FIG. 3a is a cross-section of the capacitive graded section taken along line 3a—3a of FIG. 3.

Referring to FIGS. 3 and 3a, when utilizing metallized tapes 40, the tapes 40 can be machine applied in layers extending from one end of the sleeve 12 to the other. Alternatively, the shielding ring 14 may be mounted on a single sleeve with the tapes applied in layers which extend from one end of the sleeve to the other end, overlapping the shielding ring 14, which would then take the form of a thin conductor. The capacitive tapes 40, as shown in FIG. 3, have their adjacent edges spaced closely apart, but they may be overlapped or abutted as desired.

The metallized capacitive tapes 40 are alternated with insulating tapes 42, see FIG. 3a, to provide the necessary dielectric material between adjacent layers of capacitors. (The metallized strip 41 on the opposite side of each tape 40 bridges the gap 43 between the metallized strips 45.) The tapes 40 and 42 may be applied in a continuous helix similar to the application of conventional cable insulating tapes. The dimensioning and positioning of overlying capacitors controls longitudinal stress distribution. The remote end capacitor of each capacitive tape 40 is electrically grounded by being electrically connected to the metallic shield 26.

Figure 4:
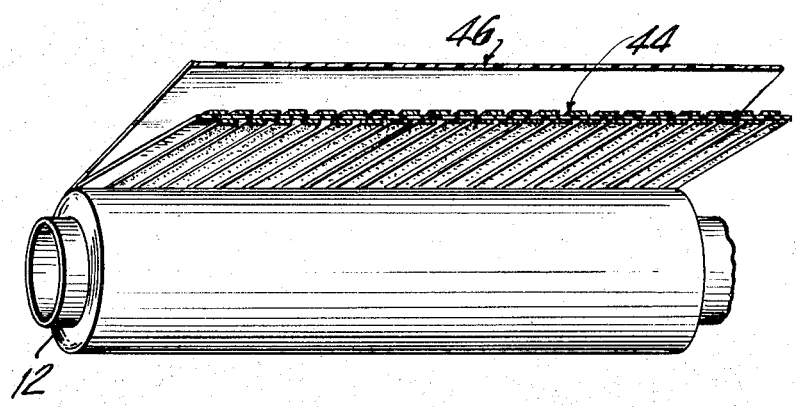
FIG. 4 is a perspective view of a graded capacitance section being formed about the rigid supporting sleeve by alternating capacitive and insulating sheets.

Referring to FIG. 4, alternate layers of capacitive sheets 44 and insulating sheets 46 are substituted for the tapes 40 and 42 shown in FIGS. 3 and 3a. One or more metallized capacitive sheets 44 are applied over the rigid supporting sleeve 12 similar to the application of the tapes 40 and 42. To provide the necessary dielectric material between adjacent layers of capacitors, the metallized capacitive sheet 44 is alternated with one or more sheets 46 of insulating material. The metallized strips form spiral capacitors and the top and bottom metallized strips forming each capacitive tape 40 overlap as seen in FIG. 4.

The first capacitor of each capacitive section 16 or 18 is placed at the same potential as the cable conductors 32 and 34 by electrical connection to the shielding ring 14. The capacitor most remote from the shielding ring 14 is electrically grounded by connection to the metallic shield 26. Thus, grading of the condensers is obtained in the longitudinal direction, see FIG. 2.

If the metallized capacitive sheets 44 are composed of impermeable material, it is desirable to use paper for the insulating sheets 46 to provide adequate circulation of the liquid dielectric (oil) 48 within the splice 10.

The splice device 10 of the present invention is factory processed. Moisture is removed under vacuum and heat. The splice device 10 is oil impregnated in the conventional manner used for the impregnation of paper insulated cables. After oil impregnation, the splice device 10 is tested and stored under oil until needed for field installation.

In some applications it may be desirable to maintain the capacitance graded sections 16 and 18 and insulating member 24 as unassembled components. After proper drying under vacuum, the capacitive graded sections 16 and 18 may be embedded in epoxy resin or any other material having substantially similar insulation properties and shipped to the field joint installation site as a whole prefabricated splice device 10 or maintained separately for field assembly. In either case, the prefabricated splice device 10 or separate components are pretested at the factory.

The use of the prefabricated capacitive graded splice device 10 of the present invention minimizes cable preparation and splice installation time. No penciling of the main cable insulation 36 and 38 of the cable ends to be joined is required. The main cable shields 19 and 21 and the cable insulation 36 and 38 is removed in a straight cut for a given length dependent upon the connector 30 used to join the central conductors 32 and 34. If required, paper tubes 50 and 52, which have been oil impregnated, are placed over the main cable insulation 36 and 38. These paper tubes 50 and 52 provide additional insulation between the main cable insulation 36 and 38 and the sleeve 12, and also serve to concentrically position the sleeve 12 in tight-fitting contact about the cable ends to be joined. The end portions 54 and 56 of the paper tubes 50 and 52, respectively, which protrude outwardly from the cylindrical insulating sleeve 24 and metallic shield 26 are advantageously sloped to receive metallic shielding tape 23 and 33 which couples the metallic shield 26 to the main cable shields 19 and 21. It should be apparent that the paper tubes 50 and 52 are not required if the rigid supporting sleeve 12 fits tightly over the main cable insulation 36 and 38.

When joining the ends of two cables, the paper tubes 50 and 52 are slipped over the cable insulation 36 and 38 from which the insulation shield has been removed for a given distance as required by the length of the tubes 50 and 52, the prefabricated graded capacitance splice device 10, including the rigid supporting member 12, the ring 14, the graded capacitance sections 16 and 18, the cylindrical insulating sleeve 24, and the metallic shield 26 is slipped over one of the tubes 50 or 52. The cable connector 30 is applied in the usual manner and the electrostatic connectors 28 are assembled on the connector 30. The prefabricated splice device 10 is then slipped into position. The shielding tapes 23 and 33 are wound around the sloped portions 54 and 56 of the paper tubes 50 and 52, respectively, electrically connecting the main cable shields 19 and 21 to the metallic shield 26 of the splice device 10.

When epoxy embedded elements are used, the rigid supporting member 12 may be omitted. If such a splice device 10 is field assembled, the embedded capacitive graded elements are applied and slipped over the paper tubes 50 and 52, respectively, if required, and the equipotential shielding ring 14 is also slipped over one of the paper tubes 50 or 52. An outer insulating cylinder is slipped over one of the cable ends. The central conductors 32 and 34 are joined by a cable connector 30. The equipotential shielding ring 14 and the epoxy embedded capacitive graded elements are slipped into position. Electrical connection between the connector 30 and the equipotential shielding ring 14 is made by the spring type electrostatic connectors 28. The outer insulating cylinder is positioned around the two inner capacitive graded elements and the shielding ring 14. This outer insulating cylinder may take the form of oil impregnated paper. This assembly is shielded, e.g., by metallic shielding tapes (not shown).

The prefabricated capacitive graded splice device 10 of the present invention may be utilized with pipe, self-contained and solid type paper insulated cables. With self-contained cables the splice device 10 can be used for normal joints and for stop joints. When used for stop joints, a stop cylinder is applied directly over the cable insulation and the prefabricated splice device 10 is applied thereover. Further, with selfcontained cables, a metal casing, which forms part of the cable enclosure, will surround the splice device 10. With pipe type cables, a section of the pipe will surround the splice device 10.

The longitudinal voltage stresses in the capacitive graded splice device 10 of the present invention have been found to be in the same range as conventional field assembled splices which utilize stress relief cones. Further, the capacitive graded splice device 10 of the present invention has been found to possess excellent dielectric properties, reduce the installation time to below 40% of that required for conventional splices, and provide high reliability.

It should be understood by those skilled in the art that various modifications may be made in the present invention without departing from the spirit and scope thereof as described in the specification and defined in the appended claims. It should further be understood that the prefabricated capacitive graded splice device of the present invention can be readily modified for use in cable terminations.

What is claimed is:

1. A capacitive graded splice device for joining the ends of two high voltage cables each having a central conductor and an outer shield, said device comprising:

a non-conducting rigid supporting sleeve having an inner diameter larger than the outer diameter of the cables to be joined;
an electrically conducting equipotential shielding ring concentrically mounted around the supporting sleeve at the longitudinal center thereof, the supporting sleeve having at least one slot therethrough under the equipotential shielding ring;
a cable connector positioned within the supporting sleeve at the longitudinal center thereof for electrically connecting the central conductors of the two cables to be joined;
electrically conducting electrostatic connector means extending from the cable connector to the equipotential shielding ring through the slot or slots in the supporting sleeve;
a pair of capacitive graded sections formed from alternating layers of helically wound capacitive tapes and insulating tapes, the sections concentrically mounted around the supporting sleeve adjacent both ends of the equipotential shielding ring, the capacitor elements of the sections located at the end of each of the sections adjacent the equipotential shielding ring being electrically connected to it;
a cylindrical insulating member concentrically mounted around the capacitive graded sections and the equipotential shielding ring; and
an electrically conducting metallic shield concentrically mounted around the cylindrical insulating member for connection to the outer shields of the cables to be joined, the electrically conducting metallic shield being connected to the capacitor elements located at the end of each of the capacitive graded sections remote from the equipotential shielding ring.

2. The cable splice device of claim 1 further including paper tubes concentrically mounted within the supporting sleeve for positioning the sleeve on each of the cables to be joined.

3. A capacitive graded splice device for joining the ends of two high voltage cables each having a central conductor and an outer shield, said device comprising:

a non-conducting rigid supporting sleeve having an inner diameter larger than the outer diameter of the cables to be joined;
an electrically conducting equipotential shielding ring concentrically mounted around the supporting sleeve at the longitudinal center thereof, the supporting sleeve having at least one slot therethrough under the equipotential shielding ring;
a cable connector positioned within the supporting sleeve at the longitudinal center thereof for electrically connecting the central conductors of the two cables to be joined;
electrically conducting electrostatic connector means extending from the cable connector to the equipotential shielding ring through the slot or slots in the supporting sleeve;

a pair of capacitive graded sections formed from alternating layers of spirally wound capacitive sheets and insulating sheets, the sections concentrically mounted around the supporting sleeve adjacent both ends of the equipotential shielding ring, the capacitor elements of the sections located at the end of each of the sections adjacent the equipotential shielding ring being electrically connected to it;

a cylindrical insulating member concentrically mounted around the capacitive graded sections and the equipotential shielding ring; and an electrically conducting metallic shield concentrically mounted around the cylindrical insulating member for connection to the outer shields of the cables to be joined, the electrically conducting metallic shield being connected to the capacitor elements located at the end of each of the capacitive graded sections remote from the equipotential shielding ring.

4. The cable splice device of claim 3 further including paper tubes concentrically mounted within the supporting sleeve for positioning the sleeve on each of the cables to be joined.

* * * * *

UNITED STATES PATENT OFFICE
CERTIFICATE OF CORRECTION

Patent No. 3,845,235     Dated October 29, 1974

Inventor(s) George Bahder and Carlos Katz

It is certified that error appears in the above-identified patent and that said Letters Patent are hereby corrected as shown below:

Col. 3, line 39, "$A = c_1 / + C_2/C_3$" should be

--$A = C_1/C_3 = C_2/C_3$--

Signed and sealed this 3rd day of June 1975.

(SEAL)
Attest:

RUTH C. MASON
Attesting Officer

C. MARSHALL DANN
Commissioner of Patents
and Trademarks